United States Patent
Oshida (10) Patent No.: US 12,084,030 B2
(45) Date of Patent: Sep. 10, 2024

(54) CONTROLLER AND CONTROL METHOD

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 17/262,788

(22) PCT Filed: Jul. 15, 2019

(86) PCT No.: PCT/IB2019/056012
§ 371 (c)(1),
(2) Date: Jan. 25, 2021

(87) PCT Pub. No.: WO2020/021382
PCT Pub. Date: Jan. 30, 2020

(65) Prior Publication Data
US 2021/0309195 A1    Oct. 7, 2021

(30) Foreign Application Priority Data
Jul. 24, 2018   (JP) ................................. 2018-138350

(51) Int. Cl.
*B60T 8/00*      (2006.01)
*B60T 8/17*      (2006.01)
(Continued)

(52) U.S. Cl.
CPC ............ *B60T 8/261* (2013.01); *B60T 8/1706* (2013.01); *B60T 8/3225* (2013.01); *B60T 2201/02* (2013.01); *B60T 2230/04* (2013.01)

(58) Field of Classification Search
CPC ...... B60T 8/261; B60T 8/1706; B60T 8/3225; B60T 2201/02; B60T 2230/04
See application file for complete search history.

(56) References Cited

U.S. PATENT DOCUMENTS

2005/0168062 A1   8/2005 Nishikawa et al.
2008/0046159 A1*  2/2008 Baijens .............. B60K 31/0008
                                                   701/93
(Continued)

FOREIGN PATENT DOCUMENTS

EP      2487081 A1    8/2012
EP      3312063 A1    4/2018
(Continued)

OTHER PUBLICATIONS

International Search Report and Written Opinion for Application No. PCT/IB2019/056012 dated Oct. 22, 2019 (10 pages).

*Primary Examiner* — Truc M Do
(74) *Attorney, Agent, or Firm* — Michael Best & Friedrich LLP (57) ABSTRACT

The present invention obtains a controller and a control method capable of appropriately executing adaptive cruise control for a straddle-type vehicle while securing a driver's comfort.
In the controller and the control method according to the present invention, when braking forces are generated on wheels of the straddle-type vehicle during adaptive cruise control, in which the straddle-type vehicle is made to travel according to a distance from the straddle-type vehicle to a preceding vehicle, motion of the straddle-type vehicle, and the driver's instruction, at a braking start time point at which the braking force starts being generated on each of the wheels, braking force distribution between the front and rear wheels is brought into an initial state where the braking force generated on the rear wheel is larger than the braking force generated on the front wheel. Then, a distribution ratio for the front wheel in the braking force distribution between the front and rear wheels is increased with a lapse of time.

7 Claims, 4 Drawing Sheets

(51) Int. Cl.
    *B60T 8/26*     (2006.01)
    *B60T 8/32*     (2006.01)

(56)     References Cited

U.S. PATENT DOCUMENTS

| | | | |
|---|---|---|---|
| 2010/0168958 A1* | 7/2010 | Baino | B62J 6/027 |
| | | | 702/94 |
| 2010/0168975 A1* | 7/2010 | Takahara | B60T 8/1766 |
| | | | 701/70 |
| 2011/0273005 A1* | 11/2011 | Westerfeld | B60T 8/1766 |
| | | | 303/9.64 |
| 2012/0205968 A1* | 8/2012 | Takenouchi | B60T 8/261 |
| | | | 303/9.64 |
| 2017/0144665 A1 | 5/2017 | Ohashi et al. | |
| 2019/0248367 A1* | 8/2019 | Knitt | B60W 50/14 |

FOREIGN PATENT DOCUMENTS

| | | |
|---|---|---|
| EP | 3335955 A1 | 6/2018 |
| JP | H10167153 A | 6/1998 |
| JP | 2000264278 A | 9/2000 |
| JP | 2009029425 A | 2/2009 |
| JP | 2009116882 A | 5/2009 |

\* cited by examiner

CONTROLLER AND CONTROL METHOD

BACKGROUND OF THE INVENTION

The present disclosure relates to a controller and a control method capable of appropriately executing adaptive cruise control for a straddle-type vehicle while securing a driver's comfort.

As a conventional technique relating to a straddle-type vehicle, a technique of assisting with a driver's operation is available.

For example, a driver assistance system is disclosed in JP-A-2009-116882. Based on information detected by a sensor that detects an obstacle present in a travel direction or substantially in the travel direction, the driver assistance system warns a motorcycle driver that the motorcycle inappropriately approaches the obstacle.

SUMMARY OF THE INVENTION

By the way, as a technique of assisting with the driver's operation, it is considered to adopt adaptive cruise control, in which a vehicle travels according to a distance from a preceding vehicle, motion of the preceding vehicle, and the driver's instruction, to the straddle-type vehicle such as the motorcycle. The straddle-type vehicle tends to have an unstable posture in comparison with a four-wheeled vehicle, for example. Accordingly, the straddle-type vehicle exhibits behavior unintended by the driver due to automatic exertion of a braking force to the straddle-type vehicle during the adaptive cruise control of the straddle-type vehicle, which possibly worsens the driver's comfort.

The present invention has been made in view of the above-described problem, and therefore provides a controller and a control method capable of appropriately executing adaptive cruise control for a straddle-type vehicle while securing a driver's comfort.

Solution to Problem

A controller according to the present invention is a controller that controls travel of a straddle-type vehicle, and includes a control section capable of executing adaptive cruise control in which the straddle-type vehicle is made to travel according to a distance from the straddle-type vehicle to a preceding vehicle, motion of the straddle-type vehicle, and a driver's instruction. When the control section causes generation of braking forces on wheels of the straddle-type vehicle during the adaptive cruise control, at a braking start time point at which the braking force starts being generated on each of the wheels, the control section brings braking force distribution between the front and rear wheels into an initial state where the braking force generated on the rear wheel is larger than the braking force generated on the front wheel, and then increases a distribution ratio for the front wheel in the braking force distribution with a lapse of time.

A control method according to the present invention is a control method for controlling travel of a straddle-type vehicle, and include: when a controller causes generation of braking forces on wheels of the straddle-type vehicle during adaptive cruise control, in which the straddle-type vehicle is made to travel according to a distance from the straddle-type vehicle to a preceding vehicle, motion of the straddle-type vehicle, and a driver's instruction, at a braking start time point at which the braking force starts being generated on each of the wheels, bringing braking force distribution between the front and rear wheels into an initial state where the braking force generated on the rear wheel is larger than the braking force generated on the front wheel, and then increasing a distribution ratio for the front wheel in the braking force distribution with a lapse of time.

Advantageous Effects of Invention

In the controller and the control method according to the present invention, when the braking forces are generated on the wheels of the straddle-type vehicle during the adaptive cruise control, in which the straddle-type vehicle is made to travel according to the distance from the straddle-type vehicle to the preceding vehicle, the motion of the straddle-type vehicle, and the driver's instruction, at the braking start time point at which the braking force starts being generated on each of the wheels, the braking force distribution between the front and rear wheels is brought into the initial state where the braking force generated on the rear wheel is larger than the braking force generated on the front wheel. In this way, it is possible to suppress occurrence of pitching, which is inclination behavior of the straddle-type vehicle in a pitch direction, at the braking start time point. Then, after the braking force distribution between the front and rear wheels is brought into the initial state, the distribution ratio for the front wheel in the braking force distribution between the front and rear wheels is increased with the lapse of time. In this way, it is possible to suppress an excessive burden on a rear-wheel brake mechanism, which brakes the rear wheel, while suppressing the occurrence of the pitching caused by an abrupt change in the braking force distribution. Therefore, the adaptive cruise control for the straddle-type vehicle can appropriately be executed while the driver's comfort is secured.

DETAILED DESCRIPTION

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a driver straddles. In addition, a description will hereinafter be made on a case where an engine is mounted as a drive source capable of outputting power for driving motorcycle wheels. However, as the drive source for the motorcycle, a drive source other than the engine (for example, a motor) may be mounted, or the multiple drive sources may be mounted.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 on which a controller 60 according to an embodiment of the present invention is mounted with reference to FIG. 1 to FIG. 3.

Figure 1:
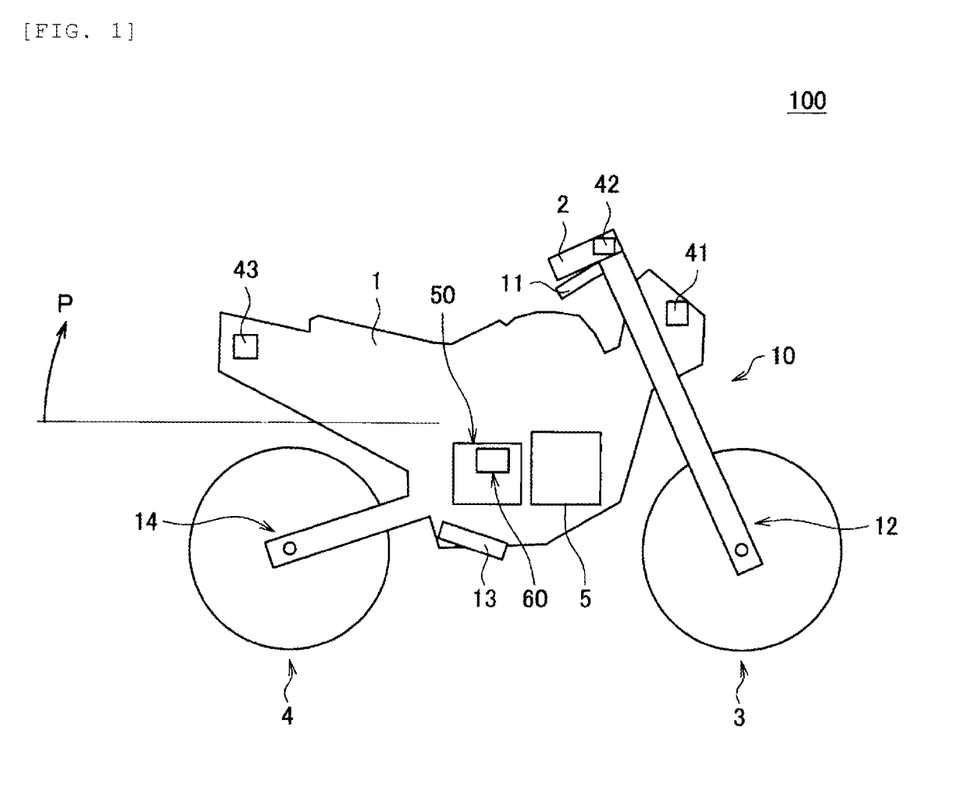
FIG. 1 is a schematic view of a configuration of a motorcycle on which a controller according to an embodiment of the present invention is mounted.

FIG. 1 is a schematic view of a configuration of the motorcycle 100 on which the controller 60 is mounted. FIG. 2 is a schematic diagram of a configuration of a brake system 10. FIG. 3 is a block diagram of an exemplary functional configuration of the controller 60.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; an engine 5; and the brake system 10. In this embodiment, the controller (ECU) 60 is provided in a hydraulic pressure control unit 50 of the brake system 10, which will be described later. As illustrated in FIG. 1 and FIG. 2, the motorcycle 100 further includes: an inter-vehicular distance sensor 41, an input device 42, an inertial measurement unit (IMU) 43, a master-cylinder pressure sensor 48, and a wheel-cylinder pressure sensor 49.

The engine 5 corresponds to an example of a drive source for the motorcycle 100, and can output power for driving a wheel (more specifically, the rear wheel 4). For example, the engine 5 is provided with: one or multiple cylinders in each of which a combustion chamber is formed; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided in an intake pipe of the engine 5, and an intake air amount for the combustion chamber varies according to a throttle opening amount as an opening degree of the throttle valve.

Figure 2:
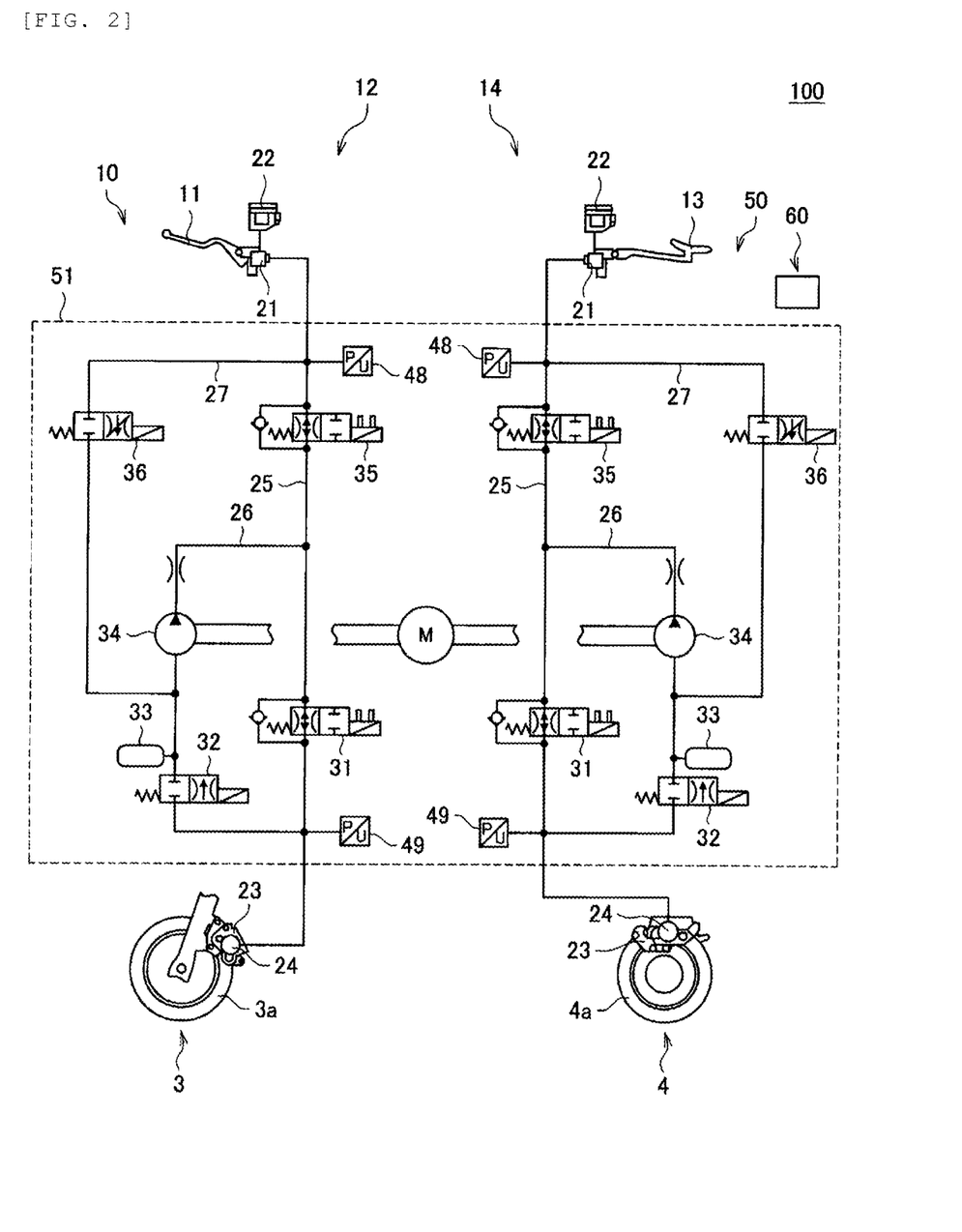
FIG. 2 is a schematic diagram of a configuration of a brake system according to the embodiment of the present invention.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and a part of the front-wheel brake mechanism 12 and a part of the rear-wheel brake mechanism 14 are included in the hydraulic pressure control unit 50. The hydraulic pressure control unit 50 is a unit that has a function of controlling a braking force to be generated on the front wheel 3 by the front-wheel brake mechanism 12 and the braking force to be generated on the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion of the primary channel 25 to which a downstream end of the secondary channel 26 is connected, a first valve (USV) 35 is provided. The supply channel 27 communicates between the master cylinder 21 and a portion of the secondary channel 26 on a suction side of the pump 34. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50) includes: components such as the inlet valves 31, the outlet valves 32, the accumulators 33, the pumps 34, the first valves 35, and the second valves 36 used to control a brake hydraulic pressure; a base body 51 in which those members are provided and channels constituting the primary channels 25, the secondary channels 26, and the supply channels 27 are formed; and the controller 60.

The base body 51 may be formed of one member or may be formed of multiple members. In the case where the base body 51 is formed of the multiple members, the components may separately be provided in the different members.

The controller 60 controls operation of each of the components in the hydraulic pressure control unit 50. In this way, the braking force to be generated on the front wheel 3 by the front-wheel brake mechanism 12 and the braking force to be generated on the rear wheel 4 by the rear-wheel brake mechanism 14 are controlled.

For example, in a normal time (that is, when none of adaptive cruise control and anti-lock brake control, which will be described later, is executed), the controller 60 opens the inlet valves 31, closes the outlet valves 32, opens the first valves 35, and closes the second valves 36. When the first brake operation section 11 is operated in such a state, in the front-wheel brake mechanism 12, the piston (not illustrated) in the master cylinder 21 is pressed to increase the hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The inter-vehicular distance sensor 41 detects a distance from the motorcycle 100 to a preceding vehicle. The inter-vehicular distance sensor 41 may detect another physical quantity that can substantially be converted to the distance from the motorcycle 100 to the preceding vehicle. Here, the preceding vehicle means a vehicle ahead of the motorcycle 100 and may include, in addition to the nearest vehicle from the motorcycle 100 on the same lane as a travel lane of the motorcycle 100, a vehicle ahead of several vehicles in front of the motorcycle 100, a vehicle traveling on an adjacent lane to the travel lane of the motorcycle 100, and the like. For example, in the case where the multiple vehicles exist ahead of the motorcycle 100, the inter-vehicular distance sensor 41 selects the preceding vehicle as a distance detection target from the motorcycle 100 on the basis of a track estimated as a travel track of the motorcycle 100 and behavior of each of the multiple vehicles. In this case, a detection result of the distance from the motorcycle 100 to the thus-selected preceding vehicle is used to execute the adaptive cruise control, which will be described later.

As the inter-vehicular distance sensor 41, for example, a camera that captures an image in front of the motorcycle 100 and a radar that can detect a distance from the motorcycle 100 to a target in front are used. In such a case, for example, the preceding vehicle is recognized by using an image captured by the camera. Then, by using a recognition result of the preceding vehicle and a detection result of the radar, the distance from the motorcycle 100 to the preceding vehicle can be detected. The inter-vehicular distance sensor 41 is provided in a front portion of the trunk 1, for example. Note that the configuration of the inter-vehicular distance sensor 41 is not limited to the above example, and a stereo camera may be used as the inter-vehicular distance sensor 41, for example.

The input device 42 accepts a travel mode selection operation by the driver, and outputs information indicative of the travel mode selected by the driver. As will be described later, in the motorcycle 100, the controller 60 can execute the adaptive cruise control. The adaptive cruise control is control in which the motorcycle 100 is made to travel according to the distance from the motorcycle 100 to the preceding vehicle, motion of the motorcycle 100, and the driver's instruction. By using the input device 42, the driver can select, as one of the travel modes, the travel mode in which the adaptive cruise control is executed. For example, as the input device 42, a lever, a button, a touch screen, or the like is used. The input device 42 is provided on the handlebar 2, for example.

The IMU 43 includes a three-axis gyroscope sensor and a three-directional acceleration sensor, and detects a posture of the motorcycle 100. For example, the IMU 43 detects a pitch angle of the motorcycle 100, and outputs a detection result. The IMU 43 may detect another physical quantity that can substantially be converted to the pitch angle of the motorcycle 100. The pitch angle corresponds to an angle that indicates an inclination of the trunk 1 of the motorcycle 100 in a pitch direction (that is, a rotational direction P around a rotation axis along a vehicle width direction illustrated in FIG. 1) with respect to a horizontal direction. The IMU 43 is provided in the trunk 1, for example. Note that, in the motorcycle 100, a sensor only having a function of detecting the pitch angle may be used instead of the IMU 43.

The master-cylinder pressure sensor 48 detects the hydraulic pressure of the brake fluid in the master cylinder 21, and outputs a detection result. The master-cylinder pressure sensor 48 may detect another physical quantity that can substantially be converted to the hydraulic pressure of the brake fluid in the master cylinder 21. The master-cylinder pressure sensor 48 is provided in each of the front-wheel brake mechanism 12 and the rear-wheel brake mechanism 14.

The wheel-cylinder pressure sensor 49 detects the hydraulic pressure of the brake fluid in the wheel cylinder 24, and outputs a detection result. The wheel-cylinder pressure sensor 49 may detect another physical quantity that can substantially be converted to the hydraulic pressure of the brake fluid in the wheel cylinder 24. The wheel-cylinder pressure sensor 49 is provided in each of the front-wheel brake mechanism 12 and the rear-wheel brake mechanism 14.

The controller 60 controls travel of the motorcycle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

Figure 3:
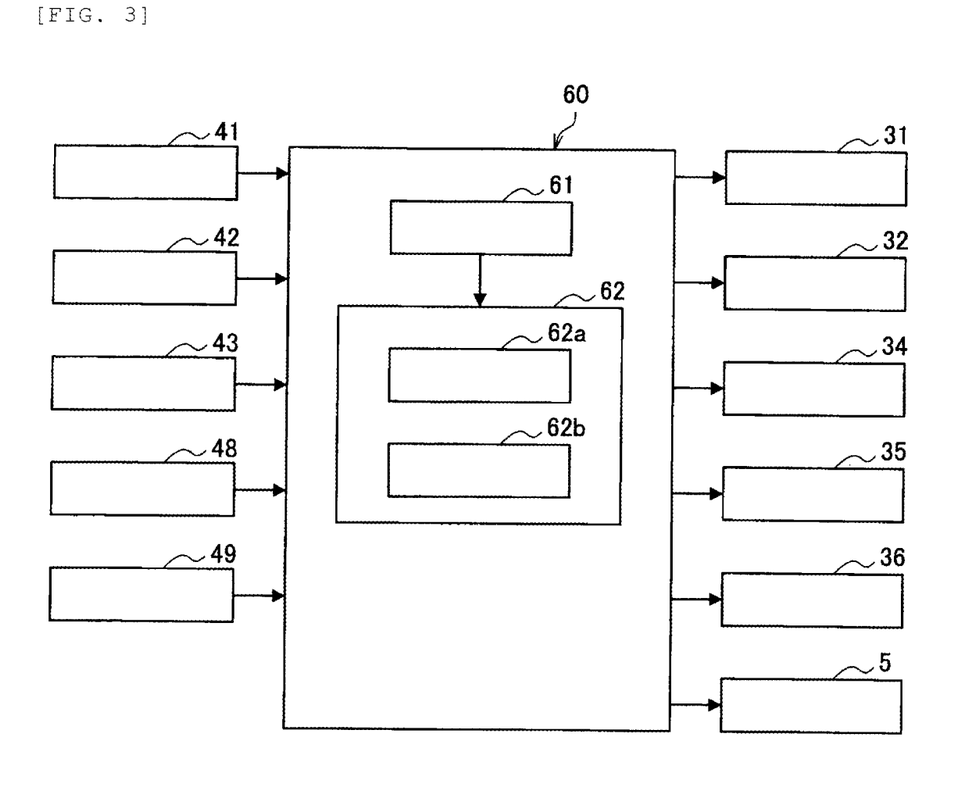
FIG. 3 is a block diagram of an exemplary functional configuration of the controller according to the embodiment of the present invention.

As illustrated in FIG. 3, the controller 60 includes an acquisition section 61 and a control section 62, for example.

The acquisition section 61 acquires information that is output from each of the devices mounted on the motorcycle 100, and outputs the acquired information to the control section 62. For example, the acquisition section 61 acquires the information output from the inter-vehicular distance sensor 41, the input device 42, the IMU 43, the master-cylinder pressure sensor 48, and the wheel-cylinder pressure sensor 49.

The control section 62 controls operation of each of the devices mounted on the motorcycle 100, so as to control drive power and the braking force exerted on the motorcycle 100.

Here, by controlling the operation of each of the devices mounted on the motorcycle 100, the control section 62 can execute the adaptive cruise control in which the motorcycle 100 is made to travel according to the distance from the motorcycle 100 to the preceding vehicle, the motion of the motorcycle 100, and the driver's instruction. More specifically, in the case where the driver selects the travel mode in which the adaptive cruise control is executed, the control section 62 executes the adaptive cruise control. Note that, in the case where the driver performs an accelerator operation or a brake operation during the adaptive cruise control, the control section 62 cancels the adaptive cruise control.

In the adaptive cruise control, the distance from the motorcycle 100 to the preceding vehicle is controlled to approximate a reference distance. As the distance from the motorcycle 100 to the preceding vehicle, the reference distance is set to a value with which the driver's safety can be secured. In the case where no preceding vehicle is recognized, a speed of the motorcycle 100 is controlled to a set speed, which is set in advance. In addition, in the adaptive cruise control, each of acceleration and deceleration of the motorcycle 100 is controlled to be equal to or lower than an upper limit value of such extent that does not worsen the driver's comfort.

More specifically, during the adaptive cruise control, the control section 62 calculates a target value of the acceleration (hereinafter referred to as target acceleration) or a target value of the deceleration (hereinafter referred to as target deceleration) on the basis of a comparison result between the distance from the motorcycle 100 to the preceding vehicle and the reference distance and on the basis of a relative speed between the motorcycle 100 and the preceding vehicle. Then, based on a calculation result, the control section 62 controls the drive power and the braking force exerted on the motorcycle 100.

For example, in the case where the distance from the motorcycle 100 to the preceding vehicle is longer than the reference distance, the control section 62 calculates the target acceleration that corresponds to a difference between the distance from the motorcycle 100 to the preceding vehicle and the reference distance. On the other hand, in the case where the distance from the motorcycle 100 to the preceding vehicle is shorter than the reference distance, the control section 62 calculates the target deceleration that corresponds to the difference between the distance from the motorcycle 100 to the preceding vehicle and the reference distance.

The control section 62 includes a drive control section 62a and a brake control section 62b, for example.

The drive control section 62a controls the drive power that is transmitted to the wheel of the motorcycle 100 during the adaptive cruise control. More specifically, during the adaptive cruise control, the drive control section 62a outputs a command to an engine control unit (not illustrated), which outputs a signal to control operation of each of the components of the engine 5 (the throttle valve, the fuel injector, the ignition plug, and the like). In this way, the drive control section 62a controls operation of the engine 5. Consequently, during the adaptive cruise control, the drive power, which is transmitted to the wheel, is controlled.

In the normal time, the operation of the engine 5 is controlled by the engine control unit such that the drive power is transmitted to the wheel in response to the driver's accelerator operation.

Meanwhile, during the adaptive cruise control, the drive control section 62a controls the operation of the engine 5 such that the drive power is transmitted to the wheel without relying on the driver's accelerator operation. More specifically, during the adaptive cruise control, the drive control section 62a controls the operation of the engine 5 such that the acceleration of the motorcycle 100 becomes the target acceleration, which is calculated on the basis of the distance from the motorcycle 100 to the preceding vehicle and the relative speed between the motorcycle 100 and the preceding vehicle. In this way, the drive control section 62a controls the drive power transmitted to the wheel.

The brake control section 62b controls the operation of each of the components of the hydraulic pressure control unit 50 in the brake system 10, so as to control the braking force generated on the wheel of the motorcycle 100.

In the normal time, as described above, the brake control section 62b controls the operation of each of the components of the hydraulic pressure control unit 50 such that the braking force is generated on the wheel in response to the driver's brake operation.

Meanwhile, during the adaptive cruise control, the brake control section 62b controls the operation of each of the components such that the braking force is generated on the wheel without relying on the driver's brake operation. More specifically, during the adaptive cruise control, the brake control section 62b controls the operation of each of the components of the hydraulic pressure control unit 50 such that the deceleration of the motorcycle 100 becomes the target deceleration, which is calculated on the basis of the distance from the motorcycle 100 to the preceding vehicle and the relative speed between the motorcycle 100 and the preceding vehicle. In this way, the brake control section 62b controls the braking force generated on the wheel.

For example, during the adaptive cruise control, the brake control section 62b brings the motorcycle 100 into a state where the inlet valve 31 is opened, the outlet valve 32 is closed, the first valve 35 is closed, and the second valve 36 is opened, and drives the pump 34 in such a state, so as to increase the hydraulic pressure of the brake fluid in the wheel cylinder 24 and generate the braking force on the wheel. In addition, the brake control section 62b regulates the hydraulic pressure of the brake fluid in the wheel cylinder 24 by controlling an opening amount of the first valve 35, for example. In this way, the brake control section 62b can control the braking force generated on the wheel.

Here, during the adaptive cruise control, the brake control section 62b separately controls operation of each of the front-wheel brake mechanism 12 and the rear-wheel brake mechanism 14, so as to separately control the hydraulic pressure of the brake fluid in the wheel cylinder 24 of each of the front-wheel brake mechanism 12 and the rear-wheel brake mechanism 14. In this way, the brake control section 62b can control braking force distribution between the front and rear wheels (that is, distribution of the braking force generated on the front wheel 3 and the braking force generated on the rear wheel 4). More specifically, the brake control section 62b controls the braking force distribution between the front and rear wheels such that a total value of target values of the braking forces generated on the wheels becomes a requested braking force (that is, the braking force that is requested at the time of braking during the adaptive cruise control) corresponding to the target deceleration. The requested braking force is specifically the braking force required to bring the deceleration of the motorcycle 100 to the target deceleration, which is calculated on the basis of the distance from the motorcycle 100 to the preceding vehicle and the relative speed between the motorcycle 100 and the preceding vehicle.

Note that, in the case where at least one of the wheels is locked or possibly locked, the brake control section 62b may execute the anti-lock brake control. The anti-lock brake control is control for regulating the braking force of the wheel, which is locked or possibly locked, to a magnitude of the braking force with which locking of the wheel can be avoided.

For example, during the anti-lock brake control, the brake control section 62b brings the motorcycle 100 into a state where the inlet valve 31 is closed, the outlet valve 32 is opened, the first valve 35 is opened, and the second valve 36 is closed, and drives the pump 34 in such a state, so as to reduce the hydraulic pressure of the brake fluid in the wheel cylinder 24 and reduce the braking force generated on the wheel. In addition, the brake control section 62b closes both of the inlet valve 31 and the outlet valve 32 from the above state, for example. In this way, the brake control section 62b can keep the hydraulic pressure of the brake fluid in the wheel cylinder 24 and thus can keep the braking force generated on the wheel. Furthermore, the brake control section 62b opens the inlet valve 31 and closes the outlet valve 32 from the above state, for example. In this way, the brake control section 62b can increase the hydraulic pressure of the brake fluid in the wheel cylinder 24 and thus can increase the braking force generated on the wheel.

As described above, in the controller 60, the control section 62 can execute the adaptive cruise control. Here, when the control section 62 causes the generation of the braking forces on the wheels of the motorcycle 100 during the adaptive cruise control, at a braking start time point at which the braking force starts being generated on each of the wheels, the control section 62 brings the braking force distribution between the front and rear wheels into an initial state where the braking force generated on the rear wheel 4 is larger than the braking force generated on the front wheel 3. Then, with a lapse of time, the control section 62 increases a distribution ratio for the front wheel 3 in the braking force distribution. In this way, while the driver's comfort is secured, the adaptive cruise control for the motorcycle 100 is appropriately executed. A detailed description will be made below on processing related to wheel braking control during such adaptive cruise control executed by the controller 60.

The description has been made above on the example in which the drive control section 62a controls the operation of the engine 5 via the engine control unit. However, the drive control section 62a may output a signal for controlling the operation of each of the components of the engine 5, so as to directly control the operation of each of the components of the engine 5. In such a case, the drive control section 62a controls the operation of the engine 5 in the normal time in a similar manner to the operation of the engine 5 during the adaptive cruise control.

<Operation of Controller>

A description will be made on operation of the controller 60 according to the embodiment of the present invention with reference to FIG. 4.

Figure 4:
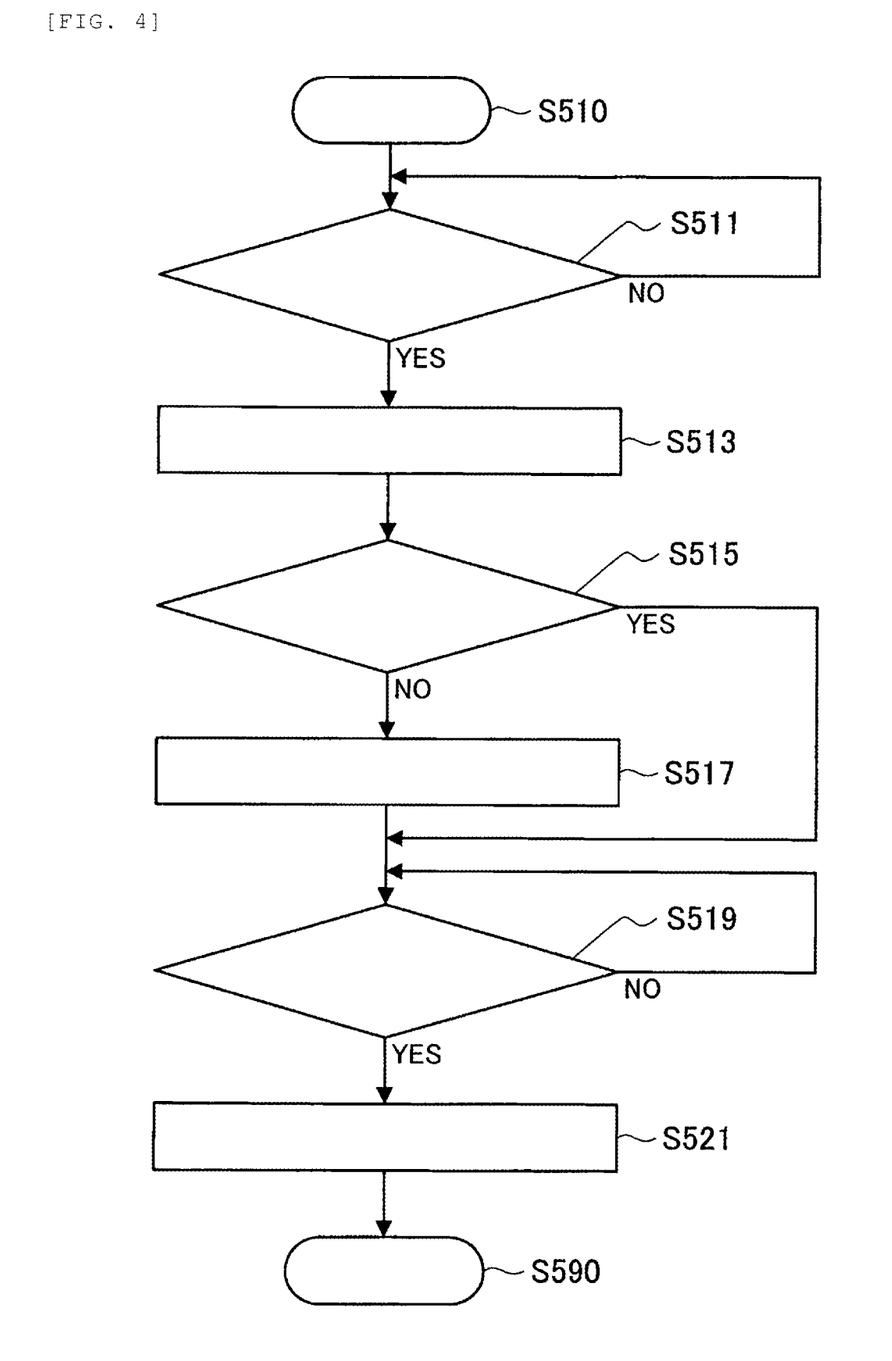
FIG. 4 is a flowchart of an exemplary processing procedure that is executed by the controller according to the embodiment of the present invention.

FIG. 4 is a flowchart of an exemplary processing procedure that is executed by the controller 60. More specifically, a control flow illustrated in FIG. 4 corresponds to a processing procedure related to the wheel braking control during the adaptive cruise control, which is executed by the control section 62 of the controller 60, and is repeatedly executed during the adaptive cruise control. In addition, step S510 and step S590 in FIG. 4 respectively correspond to initiation and termination of a control flow illustrated in FIG. 4.

When the control flow illustrated in FIG. 4 is initiated, in step S511, the control section 62 determines whether a request to start decelerating the motorcycle 100 is made. If the control section 62 determines that the request to start decelerating the motorcycle 100 is made (step S511/YES), the processing proceeds to step S513. On the other hand, if the control section 62 determines that the request to start decelerating the motorcycle 100 is not made (step S511/NO), the determination processing in step S511 is repeated.

For example, in the case where it is determined, on the basis of the relative speed to the preceding vehicle, that there is a relatively high possibility that the distance from the motorcycle 100 to the preceding vehicle becomes shorter than the reference distance is relatively high under a situation where the distance from the motorcycle 100 to the preceding vehicle is reduced from the longer distance than the reference distance, the control section 62 determines that the request to start decelerating the motorcycle 100 is made.

If it is determined YES in step S511, in step S513, the brake control section 62b starts braking the wheels of the motorcycle 100. More specifically, during the braking of the wheels, as described above, the brake control section 62b controls the braking force generated on each of the wheels such that the deceleration of the motorcycle 100 becomes the target deceleration, which is calculated on the basis of the distance from the motorcycle 100 to the preceding vehicle and the relative speed between the motorcycle 100 and the preceding vehicle.

Here, at the braking start time point at which the braking force starts being generated on each of the wheels, the brake control section 62b brings the braking force distribution between the front and rear wheels into the initial state where the braking force generated on the rear wheel 4 is larger than the braking force generated on the front wheel 3.

During the braking of the wheels, an inertial force is exerted on the motorcycle 100 in a forward direction that is an advancing direction of the motorcycle 100. Accordingly, as the distribution ratio for the front wheel 3 in the braking force distribution is increased, the motorcycle 100 is more likely to be inclined in the pitch direction such that a rear portion of the motorcycle 100 is lifted. Here, pitching as inclination behavior of the motorcycle 100 in the pitch direction is behavior unintended by the driver, and thus becomes a cause of worsening the driver's comfort. Accordingly, at the braking start time point, the braking force distribution between the front and rear wheels is brought into the initial state where the braking force generated on the rear wheel 4 is larger than the braking force generated on the front wheel 3. In this way, the pitching of the motorcycle 100 can be suppressed at the braking start time point. In addition, from a perspective of further effectively suppressing the pitching at the braking start time point, the brake control section 62b preferably causes the generation of the braking force only on the rear wheel 4 in the above initial state.

Next, in step S515, the control section 62 determines whether the driver's riding posture is inappropriate as the posture during the deceleration. If it is determined that the driver's riding posture is appropriate as the posture during the deceleration (step S515/NO), the processing proceeds to step S517. On the other hand, if it is determined that the driver's riding posture is inappropriate as the posture during the deceleration (step S515/YES), the processing proceeds to step S519.

More specifically, the inappropriate posture as the posture during the deceleration means such a posture that the driver is not ready for the behavior of the motorcycle 100 during the deceleration and thus there may be a possibility that the driver falls off the motorcycle 100.

For example, in the case where it is determined that the driver does not hold the handlebar 2, the control section 62 determines that the driver's riding posture is inappropriate as the posture during the deceleration. The determination on whether the driver grasps the handlebar 2 can be made by using a proximity sensor provided on the handlebar 2, for example.

In addition, for example, in the case where it is determined that the driver does not hold the trunk 1 between both of his/her legs, the control section 62 determines that the driver's riding posture is inappropriate as the posture during the deceleration. The determination on whether the driver holds the trunk 1 between both of his/her legs can be made by using a proximity sensor provided in the trunk 1, for example.

Furthermore, for example, in the case where it is determined that a line of the driver's sight is not oriented to the front, the control section 62 determines that the driver's riding posture is inappropriate as the posture during the deceleration. The determination on whether the line of the driver's sight is oriented to the front can be made by using a device that captures an image of the driver's face and performs image processing on the acquired image to detect the line of the driver's sight, for example.

If it is determined NO in step S515, in step S517, the brake control section 62b increases the distribution ratio for the front wheel 3 in the braking force distribution between the front and rear wheels with the lapse of time.

Note that, in a process of increasing the distribution ratio for the front wheel 3 in the braking force distribution between the front and rear wheels, as described above, the braking force distribution between the front and rear wheels is controlled such that the total value of the target values of the braking forces generated on the wheels becomes the requested braking force. Accordingly, for example, under a situation where the deceleration of the motorcycle 100 remains constant (that is, the requested braking force remains constant) for a specified period from the braking start time point, in such a specified period, the braking force generated on the front wheel 3 is increased with the lapse of time while the braking force generated on the rear wheel 4 is reduced with the lapse of time.

In the adaptive cruise control, due to a reason that the distance from the motorcycle 100 to the preceding vehicle is controlled to approximate the reference distance, a braking frequency of the wheels tends to be high. For such a reason, in the case where the braking force distribution is maintained in the initial state, a burden on the rear-wheel brake mechanism 14, which brakes the rear wheel 4, is likely to become excessive. Thus, it is considered to change the braking force distribution from the initial state. However, in the case where the braking force distribution is abruptly changed at this time, the pitching of the motorcycle 100 is likely to occur. Accordingly, as described above, after the braking force distribution is brought into the initial state, the distribution ratio for the front wheel 3 is increased with the lapse of time. In this way, it is possible to suppress the excessive burden on the rear-wheel brake mechanism 14, which brakes the rear wheel 4, while suppressing the occurrence of the pitching caused by the abrupt change in the braking force distribution.

Here, from a perspective of further stabilizing the posture of the motorcycle 100 after the braking force distribution is brought into the initial state, the brake control section 62b preferably controls the braking force distribution between the front and rear wheels on the basis of the pitch angle of the motorcycle 100 after bringing the braking force distribution into the initial state.

More specifically, after bringing the braking force distribution into the initial state, the brake control section 62b may control a change rate of the braking force distribution on the basis of the pitch angle of the motorcycle 100. For example, in the case where the pitch angle is large, the brake control section 62b may reduce the change rate of the braking force distribution to be lower than the change rate of the braking force distribution at the time when the pitch angle is small. For example, in the case where a change rate of the pitch angle is high, the brake control section 62b may reduce the change rate of the braking force distribution to be lower than the change rate of the braking force distribution at the time when the change rate of the pitch angle is low.

In addition, after bringing the braking force distribution into the initial state, the brake control section 62b may control an increase start time point, at which the distribution ratio for the front wheel 3 in the braking force distribution starts being increased, on the basis of the pitch angle of the motorcycle 100. For example, the brake control section 62b may determine a time point, at which the brake control section 62b determines that the change in the pitch angle is stabilized, as the increase start time point. Then, at such an increase start time point, the brake control section 62b may start increasing the distribution ratio for the front wheel 3 in the braking force distribution. The brake control section 62b determines that the change in the pitch angle is stabilized when a state where the pitch angle is smaller than a reference pitch angle continues for a reference period, for example. More specifically, each of the reference pitch angle and the reference period is appropriately set to a value with which the stabilized change in the pitch angle can be determined appropriately to such extent that it is possible to determine that the possibility of the pitching, which occurs when the distribution ratio for the front wheel 3 in the braking force distribution starts being increased, is sufficiently low.

A mode of increasing the distribution ratio for the front wheel 3 in the braking force distribution, which is conducted after the braking force distribution is brought into the initial state, only needs to be the increase with the lapse of time, and thus is not particularly limited. For example, the brake control section 62b may increase the distribution ratio for the front wheel 3 stepwise with the lapse of time. For example, the brake control section 62b may increase the distribution ratio for the front wheel 3 continuously with the lapse of time. For example, the brake control section 62b may increase the distribution ratio for the front wheel 3 such that a transition average of the distribution ratio for the front wheel 3 in the braking force distribution is increased with the lapse of time. That is, the brake control section 62b may change the distribution ratio for the front wheel 3 in the braking force distribution such that the distribution ratio for the front wheel 3 is increased with accompanying a temporary reduction.

After step S517, or in the case where it is determined YES in step S515, in step S519, the control section 62 determines whether a request to terminate the deceleration of the motorcycle 100 is made. If the control section 62 determines that the request to terminate the deceleration of the motorcycle 100 is made (step S519/YES), the processing proceeds to step S521. On the other hand, if the control section 62 determines that the request to terminate the deceleration of the motorcycle 100 is not made (step S519/NO), the determination processing in step S519 is repeated.

For example, in the case where the distance from the motorcycle 100 to the preceding vehicle is increased from the shorter distance than the reference distance and then exceeds the reference distance, the control section 62 determines that the request to terminate the deceleration of the motorcycle 100 is made.

If it is determined YES in step S519, in step S521, the brake control section 62b terminates the braking of the wheels of the motorcycle 100.

Next, the control flow illustrated in FIG. 4 is terminated.

Note that, also in the case where the request to terminate the deceleration of the motorcycle 100 is made in the middle of the processing to increase the distribution ratio for the front wheel 3 in the braking force distribution (that is, the processing in step S517), the brake control section 62b terminates the braking of the wheels. Then, the control flow illustrated in FIG. 4 is terminated.

As described above, in the control flow illustrated in FIG. 4, in the case where the control section 62 determines that the driver's riding posture is inappropriate as the posture during the deceleration, the control section 62 prohibits the increase of the distribution ratio for the front wheel 3 with the lapse of time after the braking force distribution between the front and rear wheels is brought into the initial state.

<Effects of Controller>

A description will be made on effects of the controller 60 according to the embodiment of the present invention.

In the controller 60, when the control section 62 causes the generation of the braking forces on the wheels of the motorcycle 100 during the adaptive cruise control, at the braking start time point at which the braking force starts being generated on each of the wheels, the control section 62 brings the braking force distribution between the front and rear wheels into the initial state where the braking force generated on the rear wheel 4 is larger than the braking force generated on the front wheel 3. Then, with the lapse of time, the control section 62 increases the distribution ratio for the front wheel 3 in the braking force distribution. In this way, it is possible to suppress the occurrence of the pitching of the motorcycle 100 at the braking start time point. Furthermore, it is possible to suppress the excessive burden on the rear-wheel brake mechanism 14, which brakes the rear wheel 4, while suppressing the occurrence of the pitching caused by the abrupt change in the braking force distribution. Therefore, the adaptive cruise control for the motorcycle 100 can appropriately be executed while the driver's comfort is secured.

Preferably, in the controller 60, the control section 62 causes the generation of the braking force only on the rear wheel 4 in the initial state. In this way, it is possible to further effectively suppress the occurrence of the pitching of the motorcycle 100 at the braking start time point.

Preferably, in the controller 60, after bringing the braking force distribution into the initial state, the control section 62 controls the braking force distribution on the basis of the pitch angle of the motorcycle 100. In this way, it is possible to appropriately suppress the occurrence of the pitching, which is caused by the increase in the distribution ratio for the front wheel 3, after the braking force distribution is brought into the initial state. As a result, it is possible to further stabilize the posture of the motorcycle 100 after the braking force distribution is brought into the initial state. Therefore, the driver's comfort can further appropriately be secured.

Preferably, in the controller 60, after bringing the braking force distribution into the initial state, the control section 62 controls the change rate of the braking force distribution on the basis of the pitch angle of the motorcycle 100. In this way, it is possible to appropriately suppress the occurrence of the pitching, which is caused by the excessive increase in the change rate of the braking force distribution, after the braking force distribution is brought into the initial state. As a result, it is possible to further effectively stabilize the posture of the motorcycle 100 after the braking force distribution is brought into the initial state. Therefore, the driver's comfort can further appropriately be secured.

Preferably, in the controller 60, after bringing the braking force distribution into the initial state, the control section 62 controls the increase start time point, at which the distribution ratio for the front wheel 3 in the braking force distribution starts being increased, on the basis of the pitch angle of the motorcycle 100. In this way, it is possible to appropriately suppress the occurrence of the pitching, which is caused by the increase in the distribution ratio for the front wheel 3 in the braking force distribution at a time point at which the change in the pitch angle is not stabilized yet, after the braking force distribution is brought into the initial state. As a result, it is possible to further effectively stabilize the posture of the motorcycle 100 after the braking force distribution is brought into the initial state. Therefore, the driver's comfort can further appropriately be secured.

Preferably, in the controller 60, in the case where the control section 62 determines that the driver's riding posture is inappropriate as the posture during the deceleration, the control section 62 prohibits the increase of the distribution ratio for the front wheel 3 with the lapse of time after the braking force distribution between the front and rear wheels is brought into the initial state. In this way, it is possible to suppress the distribution ratio for the front wheel 3 in the braking force distribution from starting increased at the time point at which the driver is not ready for the behavior of the motorcycle 100 during the deceleration. Therefore, the driver's safety can further appropriately be secured.

The present invention is not limited to each of the embodiments that have been described. For example, all or parts of the embodiments may be combined, or only a part of each of the embodiments may be implemented.

REFERENCE SIGNS LIST

1: Trunk
2: Handlebar
3: Front wheel
3*a*: Rotor
4: Rear wheel
4*a*: Rotor
5: Engine
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Inter-vehicular distance sensor
42: Input device
43: Inertial measurement unit
48: Master-cylinder pressure sensor
49: Wheel-cylinder pressure sensor
50: Hydraulic pressure control unit
51: Base body
60: Controller
61: Acquisition section
62: Control section
62*a*: Drive control section
62*b*: Brake control section
100: Motorcycle

The invention claimed is:

1. A controller (60) that controls travel of a straddle-type vehicle (100), the controller comprising:
   a control section (62) configured to execute adaptive cruise control in which the straddle-type vehicle (100) is made to travel according to a distance from said straddle-type vehicle (100) to a preceding vehicle, motion of said straddle-type vehicle (100), and a driver's instruction, wherein
when the control section (62) automatically causes generation of braking forces on a front wheel (3) and a rear wheel (4) of the straddle-type vehicle (100) during the adaptive cruise control, at a braking start time point at which the straddle-type vehicle (100) starts being braked automatically, the control section (62) brings braking force distribution between the front wheel (3) and the rear wheel (4) into an initial state, the initial state being a state that the braking force is generated only on the rear wheel (4) or the braking force generated on the rear wheel (4) is larger than the braking force generated on the front wheel (3), and then increases a distribution ratio for the front wheel (3) in the braking force distribution with a lapse of time, and wherein the control section (62) cancels the adaptive cruise control in response to the driver performing a braking operation during the adaptive cruise control.

2. The controller according to claim 1, wherein the control section (62) controls the braking force distribution on the basis of a pitch angle of the straddle-type vehicle (100) after bringing the braking force distribution into the initial state.

3. The controller according to claim 2, wherein the control section (62) controls a change rate of the braking force distribution on the basis of the pitch angle of the straddle-type vehicle (100) after bringing the braking force distribution into the initial state.

4. The controller according to claim 2, wherein the control section (62) controls an increase start time point, at which the distribution ratio for the front wheel (3) starts being increased, on the basis of the pitch angle of the straddle-type vehicle (100) after bringing the braking force distribution into the initial state.

5. The controller according claim 1, wherein in the case where the control section (62) determines that the driver's riding posture is inappropriate as a posture during deceleration, the control section (62) prohibits an increase of the distribution ratio for the front wheel (3) with the lapse of time after bringing the braking force distribution into the initial state.

6. A control method for controlling travel of a straddle-type vehicle (100), the control method comprising:
when a controller (60) automatically causes generation of braking forces on a front wheel (3) and a rear wheel (4) of the straddle-type vehicle (100) during adaptive cruise control, in which the straddle-type vehicle (100) is made to travel according to a distance from said straddle-type vehicle (100) to a preceding vehicle, motion of said straddle-type vehicle (100), and a driver's instruction, at a braking start time point at which the straddle-type vehicle (100) starts being braked automatically, bringing braking force distribution between the front wheel (3) and the rear wheel (4) into an initial state, the initial state being a state that the braking force is generated only on the rear wheel (4) or the braking force generated on the rear wheel (4) is larger than the braking force generated on the front wheel (3), and then increasing a distribution ratio for the front wheel (3) in the braking force distribution with a lapse of time, and wherein the controller (60) cancels the adaptive cruise control in response to the driver performing a braking operation during the adaptive cruise control.

7. The controller of claim 1, wherein increasing the distribution ratio includes increasing the braking force generated on the front wheel (3) while decreasing the braking force generated on the rear wheel (4).

* * * * *